Feb. 28, 1961 B. E. LEE 2,973,064
PORTABLE TOWER
Filed March 1, 1956 7 Sheets-Sheet 1

INVENTOR
BERT E. LEE
BY
ATTORNEY

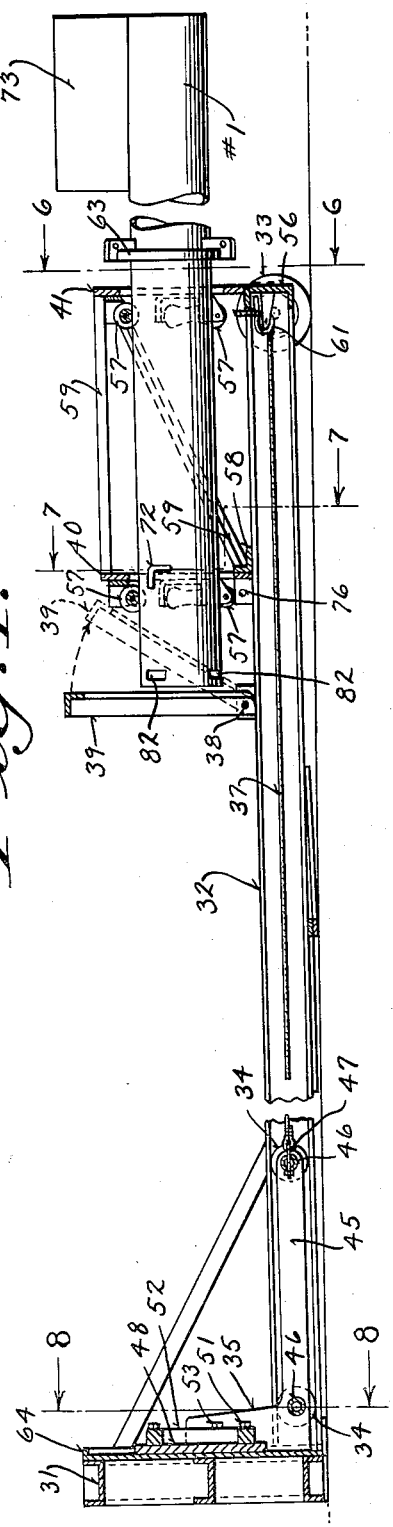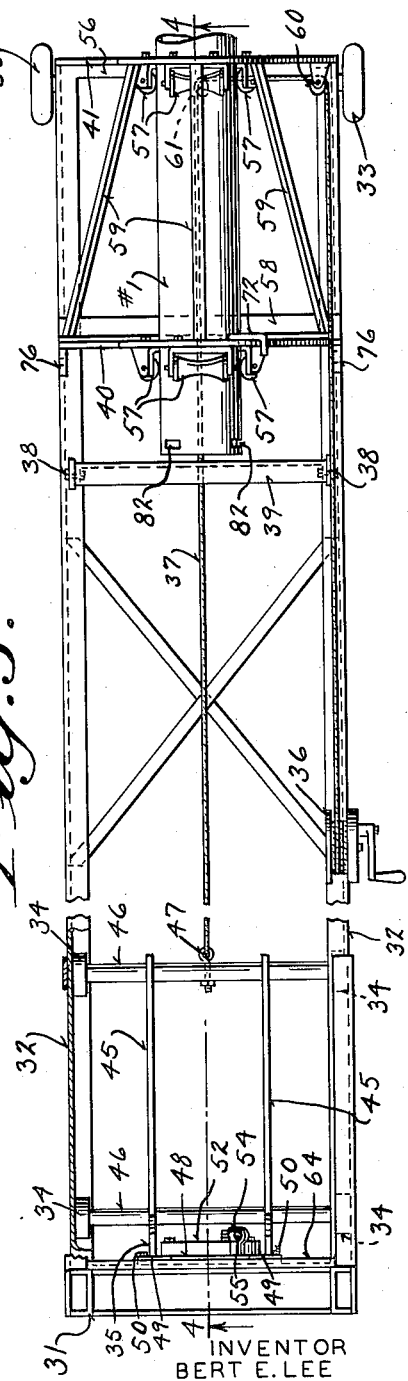

Feb. 28, 1961 B. E. LEE 2,973,064
PORTABLE TOWER
Filed March 1, 1956 7 Sheets-Sheet 3
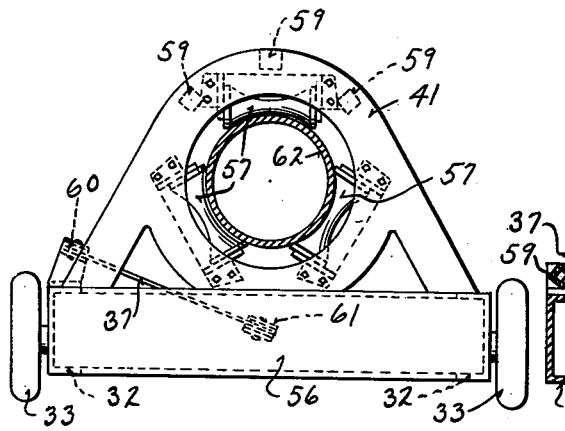
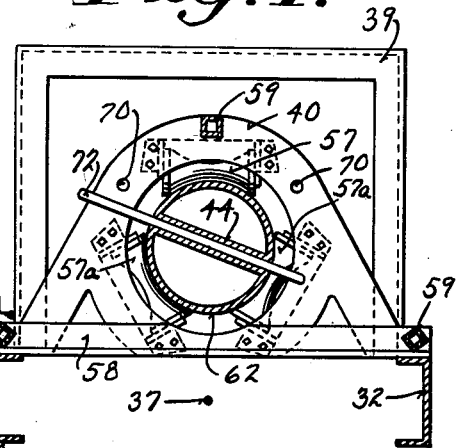
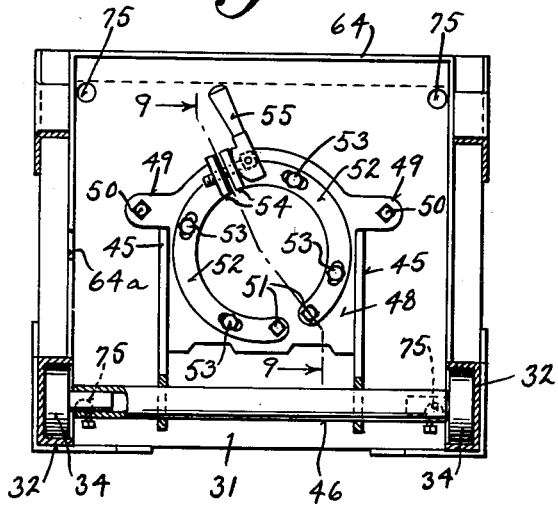
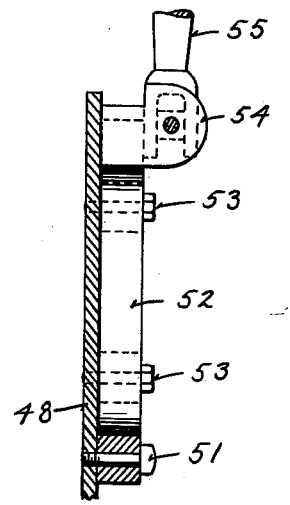
INVENTOR
BERT E. LEE
BY
ATTORNEY Feb. 28, 1961 B. E. LEE 2,973,064
PORTABLE TOWER
Filed March 1, 1956 7 Sheets-Sheet 4

INVENTOR
BERT E. LEE
BY Roger Sherman Hoar
ATTORNEY

Feb. 28, 1961 B. E. LEE 2,973,064
PORTABLE TOWER
Filed March 1, 1956 7 Sheets-Sheet 5

INVENTOR
BERT E. LEE
BY
Roger Sherman Hoar
ATTORNEY

Feb. 28, 1961  B. E. LEE  2,973,064
PORTABLE TOWER
Filed March 1, 1956  7 Sheets-Sheet 7

INVENTOR
BERT E. LEE

BY Roger Sherman Hoar

ATTORNEY

United States Patent Office 2,973,064
Patented Feb. 28, 1961

2,973,064

PORTABLE TOWER

Bert E. Lee, Milwaukee, Wis., assignor, by mesne assignments, to Gleason Reel Corp., Milwaukee, Wis., a corporation of Wisconsin Filed Mar. 1, 1956, Ser. No. 568,866

8 Claims. (Cl. 189—26)

This invention relates to a portable tower (primarily for use in communication systems) capable, when lowered, of being stored very compactly, and to means for extending and lowering the same; and resides more particularly in a sectional portable tower, including: a base capable of supporting the sections when assembled and erected, and capable of storing the sections, struts, and all other portions of the tower when lowered and disassembled; a hoist mechanism for application to the bottom end of each section in succession, starting with the top section, to extend the tower upward, section by section; means for locking the adjacent ends of successive sections together, prior to each successive extension of the tower; and guides for the sections to slide on, during erection and lowering.

Sectional towers are old in the art. So also even are such towers, in which the hoist-mechanism successively extends the sections, beginning with the uppermost, and ending with lowermost. But such hoist-mechanisms, whether they include a complicated system of rope-reeving or a telescoping series of cylinder-piston assemblies, are bulky. Furthermore, telescoping towers, with complicated hoist-mechanism, cannot nest as compactly as can be desired. Still furthermore, telescoping towers require overlapping joints, thus increasing weight and losing some height.

Accordingly, the principal object of the present invention is to attain compactness by the use of a novel hoist method, and by the use of a novel method of storing the lowered sections of the tower.

Another object is to provide, for the tower, a convenient base, into which can fit snugly all the sections and other parts of the tower, when the tower has been lowered and disassembled.

These and other objects and advantages of this invention will appear in the description which follows.

In the description, reference is made to the accompanying drawings which form a part hereof, and in which there is shown, by way of illustration and not of limitation, a specific form in which the invention may be embodied.

In the drawings:

Fig. 1 is a side elevation, partly in section, of the tower disassembled, packed in its base, and lying horizontal on the ground.

Fig. 2 is a transverse section of the same, seen as though cut along the line 2—2 of Fig. 1.

Fig. 3 is a side elevation, partly in section, of the dummy storage section of the tower.

Fig. 4 is a longitutinal section of the base, still lying horizontal on the ground, with everything unpacked, and section #1 inserted through the guides. This figure is seen as though cut along the line 4—4 of Fig. 5.

Fig. 5 is a plan view of the same (i.e., as seen from above when lying on the ground).

Fig. 6 is an end view of the same, seen as viewed from the line 6—6 of Fig. 4.

Fig. 7 is a transverse section of the same, seen as though cut along the line 7—7 of Fig. 4.

Fig. 8 is a transverse section of the same, seen as though cut along the line 8—8 of Fig. 4.

Fig. 9 is a slightly enlarged section of the rotation brake on the lifter, seen as though cut along the line 9—9 of Fig. 8.

Figure 17:
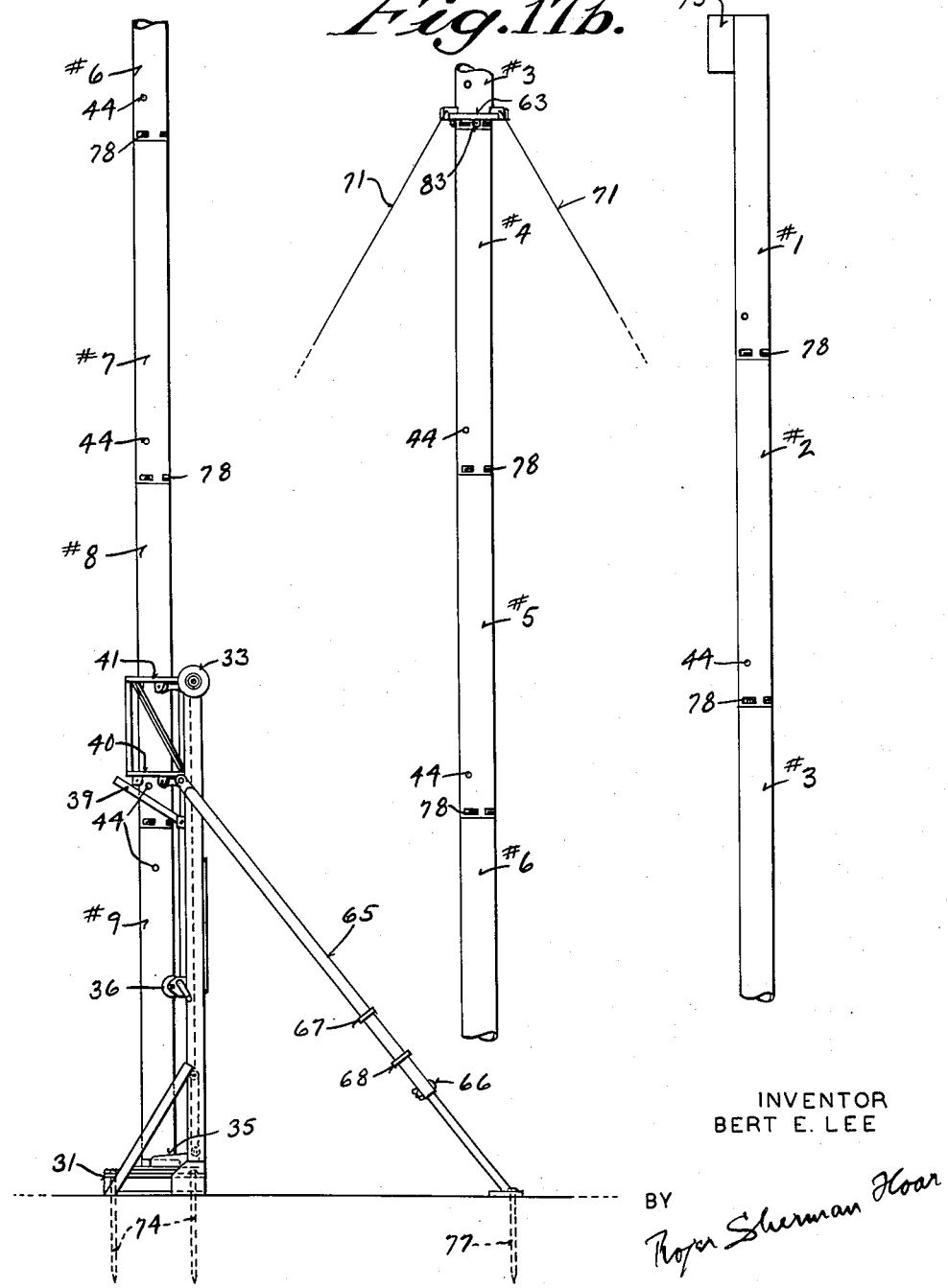

Figs. 17a, 17b, and 17c are a side elevation of the entire tower in fully erected position, but broken and extended over the several figures.

Figure 18:
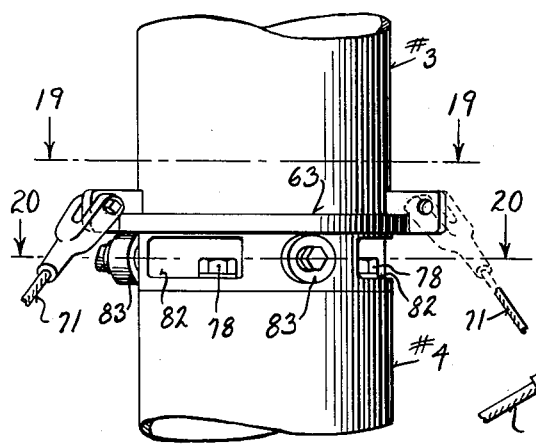

Fig. 18 is a side elevation of the adjoining ends of sections 3 and 4, showing the guy-rope ring.

Figure 19:
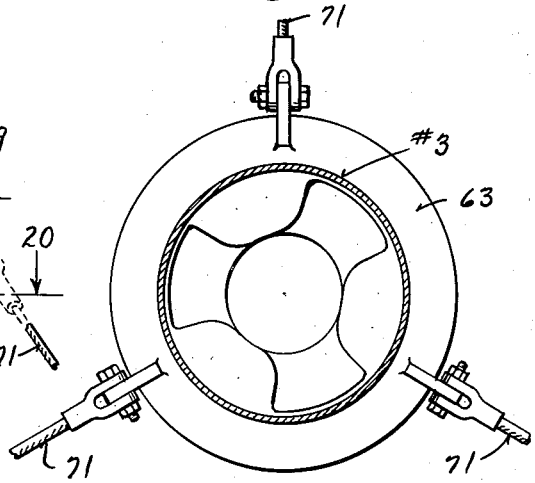

Fig. 19 is a transverse section of section #3, seen as though cut along the line 19—19 of Fig. 18.

Figure 20:
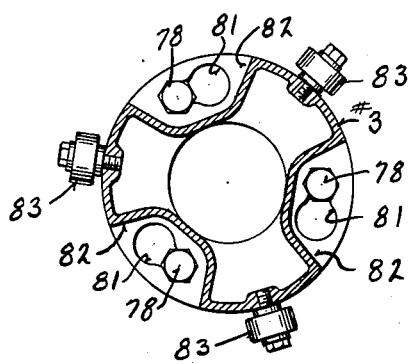

Fig. 20 is a transverse section of section #4, seen as though cut along the line 20—20 of Fig. 19.

To give an idea as to the size and weight of the tower, but without limitation thereto, it may be stated that in the preferred embodiment thereof, as described and shown hereinafter, each tower-section 62 is approximately 5½ feet in length, and the erected tower stands approximately 50 feet high. When disassembled and packed as shown in Figs. 1 and 2, the dimensions are approximately 8½ feet by 18½ inches, by 21 inches; and the weight (made of aluminum) is approximately 185 pounds.

In an emergency the erected height can be increased to about 55½ feet by cranking-up.

Throughout the description, the same reference-number is applied to the same member or to similar members.

Referring now more particularly to Fig. 1, the base will now be described. This is an L-shaped structure, consisting of a square bottom platform 31, two vertical channels 32, and several cross-braces, some of which will be specifically referred-to hereinafter.

At one end of each of channels 32 there is a rubber-tired wheel 33, so that the tower when packed can be readily moved by picking-up the other end of the base.

Running on lift-wheels 34 in channels 32, which serve as track-members therefor, there is a lifter 35, which will be described in detail later herein. The lifter is impelled by winch 36, through hoist rope 37.

Hinged to the two channels 32, as at 38, is a U-shaped cover 39, made of angle-iron. The open-space in the U is sufficiently large to permit the lifter 35 to pass through it, and conversely to permit the cover to be tilted-up when the lifter is above it. Fig. 4 shows, dotted, the raised position of this cover.

Rigidly secured to the two channels 32, adjacent their ends furthest from the bottom platform 31, are two guide-rings: a lower 40, and an upper 41. Each guide-ring carries appropriate guide-rollers. This arrangement will be described in detail later herein.

There is a dummy storage section 42, which closely resembles the tower-sections, to be later described. This storage section is shown in more detail in Fig. 3. It is a hollow cylinder, closed at one end, with an opening 43 at the other end, and transverse tube 44 for the reception of a pin as will be explained later herein.

The lifter 35 will now be detailed, with particular reference to Figures 4, 5, 8, and 9. 45 indicates two L-shaped members. Transversely through these two members, and welded thereto, and constituting therewith a rigid frame, there pass two axles 46, for the wheels 34. The hoist-rope 37 is attached, as by eye-bolt 47, to the upper one of these two axles. The bottom edges of L-shaped members 45 are welded to the edges of a horizontal bottom-plate 48, which has ears 49 for anchoring, by bolts 50, to bottom platform 31, as shown in Fig. 8. Of course, it is not so bolted during operation of the lifter.

On the bottom-plate 48, there is pivoted by bolts 51, a two-piece clamp-ring 52, guided by bolts 53 in elongated slots. Two upstanding lugs 54 can be drawn together by manual cam 55, to tighten clamp-ring 52.

Upper guide-ring 41 shown in Fig. 6, is welded, flush with the top, to the side of an inverted transverse channel 56, which extends across the top ends of vertical channels 32. On the lower face of guide-ring 41 are suspended, by appropriate brackets, guide-rollers 57. One of the tubular sections of the tower is shown guided by these rollers, as will be explained hereinafter.

Lower guide-ring 40 is shown in Fig. 7, welded to the horizontal flange of a transverse angle-iron 58, which extends across from one vertical channel 32 to the other. On the lower face of guide-ring 40 are suspended, by appropriate brackets, guide-rollers 57a. One of the tubular sections of the tower is shown guided by these rollers, as will be explained hereinafter.

Braces 59, extending from one guide-ring to the other, serve to brace these two rings.

Rope 37, in extending from winch 36 to eye-bolt 47, is reeved through sheaves 60 and 61, which are appropriately suspended from transverse channel 56.

The tower-sections will now be described. They will be designated herein by the numeral 62 when referred to without discrimination; but, whenever it is necessary to distinguish between them, they will be designated by #1, #2, #3, etc., up to #9, in the order of their erection; i.e., counting from the top of the tower down.

As shown herein, they are tubular bodies similar to storage section 42, shown in Fig. 3, except as follows.

All, except #9, have a transverse pin-tube 44 a short distance up from the bottom.

9 has such a pin-tube near the top.

All, except #1 and #9, are open at both ends, and have means for attaching to the section above and the section below.

1 is closed at the top and has no attaching means there. It has means for supporting an antenna, reflecting screen, or whatever other equipment the tower is intended to support; and may have a hole into the interior for the exit of electrical conduits, a wave-guide, or other conducting or communicating means.

Or if it be desired to train such means up the outside of the tower, the spaces between rollers 57, within guide-rings 40 and 41, afford ample room for this, or could be enlarged.

9 is closed at the bottom and has no attaching means there, although for uniformity it might well be like the other sections. It may have a hole into the interior for the entrance of electrical conduits, a wave-guide, or other conducting or communicating means.

All the other sections are identical to each other, except that at least one section (preferably #3) should have rollers for the support of guy-rope ring 63 or rings, as will be described later herein.

As shown herein, there are nine tower-sections, but there might be more or less. This would affect merely the dimensions of bottom platform 31 and cover 39.

As shown herein, the tower-sections are cylindrical and of identical diameter. But they might differ in size and might be of other cross-section, without departing from the spirit of the present invention.

Reverting now to Figs. 1 and 2, there will be described how the tower-sections, struts, and other portions of the tower, when disassembled, are stored in the base.

The base section is placed vertically with its bottom platform 31 on the ground. The cover 39 is raised, and the lifter 35 is hoisted to its top position.

This enables the nine tower-sections 62 to be then placed on end on bottom platform 31, the flanged edges 64 of which restrain the sections 62 laterally. The nine sections need not be placed in any particular order, except as follows.

1, having a closed top, cannot admit one of the two struts 65; and #9, having its pin-tube 44 near the top, would prevent inserting one of the struts more than a short distance; so neither #1 nor #9 should be placed in either of the front corners. #3 must be placed where a gap 64a in flange 64 will accommodate one of #3's rollers.

Cover 39 is then lowered to the position shown in Fig. 1, thus confining the top ends of sections 62 laterally.

Lifter 35 is lowered into contact with the screws in the tops of sections 62, except the two front corner sections.

One each of two telescoping struts 65, locked in contracted position by thumb-screw 66, is then placed inside of each of the two front-corner sections 62, as shown in Fig. 1. Flange 67 of this strut bears on the top of the section in which the strut is inserted, thus serving to hold this section down. This utilization of this flange instead of having bottom plate 48 of the lifter perform this function, enables the use of a smaller and less obtrusive bottom plate.

Flange 68 of each strut 65 is then locked to lower guide-ring 40, by eye-bolt 69, through a hole in this flange and a threaded hole 70 (see Fig. 7) in the guide-ring, thus holding the strut down against the top of the front-corner section 62.

By this time the almost loaded base-section has preferably been laid horizontal, as shown in Fig. 1.

The stakes, maul, bolt-winch and any other tools, or loose or duplicate pieces, are placed inside of storage section 42, which is then inserted, open-end first, part way through upper guide-ring 41. Guy-rope ring or rings 63 and the rolled-up guy-ropes 71 are placed around this storage section, which is then pushed all the way in, through lower guide-ring 40, into firm contact with lifter 35. In this position it is secured by pin 72, inserted through pin-tube 44, and bearing against guide-ring 40; thus holding lifter 35 down against the tops of sections 62.

Finally, the crank-handle of winch 36 may be removed and put on again reversed, so as not to protrude. The tower may be erected as follows.

The loaded base-section is laid horizontal, as shown in Fig. 1. Pin 72 is pulled out, and storage-section 42 is withdrawn, thus freeing guy-wire ring 63 and guy-wires 71.

Eye-bolts 69 are unscrewed, and struts 65 are withdrawn. Lifter 35, is raised as far as possible, as is cover 39, to permit the nine tower-sections 62 then to be removed. This is done, and lifter 35 is then lowered out of the way. The cover is left tilted up, as shown in dotted lines in Figure 1, so as to facilitate reaching the attaching means when later securing adjacent sections 62 together.

Now see Figs. 4 and 5. The antenna, reflecting screen, or other equipment, symbolically represented at 73, is attached to section #1, and guy-wire ring 63 is slid onto the lower end of this section, which is inserted through guide-rings 41 and 40, and restrained, by means of pin 72 in pin-tube 44, from going further in.

The tower, thus far assembled, may then be tilted to a vertical position, though this may be deferred until several more sections have been attached.

Figure 10:
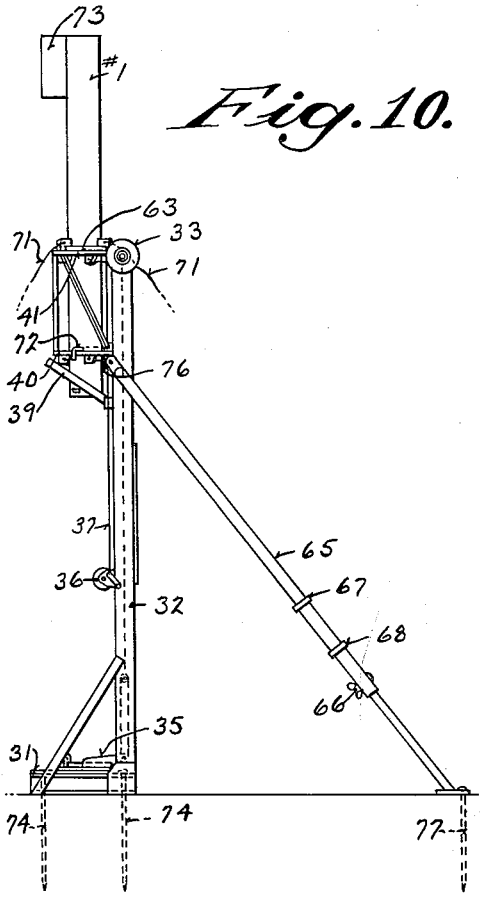
Fig. 10 is a side elevation of the base erected, with section #1 in the guides.

If so tilted (see Fig. 10), bottom platform 31 is anchored to the ground by stakes 74 through holes 75 (see Fig. 2). Each strut 65 is then extended at an angle to frames 32, and locked extended by thumb-screw 66; one end is attached to the tower at lug 76; and the other end is staked down by stake 77.

Figure 11:
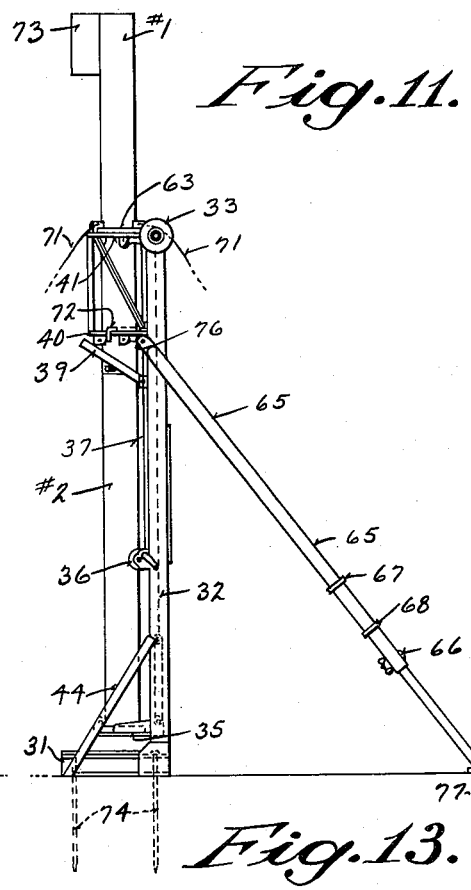
Fig. 11 is a similar side elevation, but with section #2 inserted and raised so that its upper end may be secured to the lower end of #1.
Figure 12:
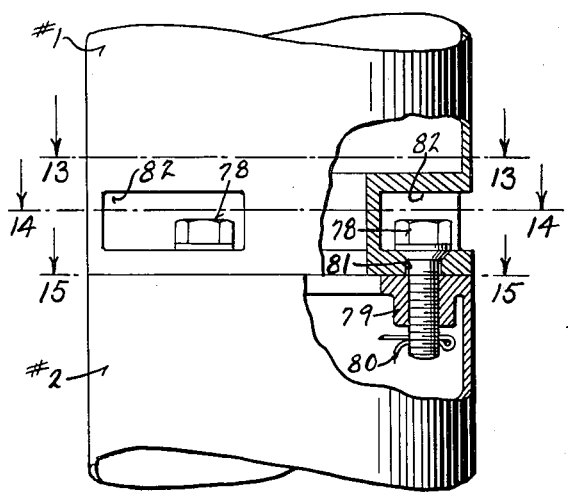
Fig. 12 is a much enlarged elevation, partly in section, of two adjoining sections of the tower, seen as viewed from the line 12—12 of Fig. 13.
Figure 13:
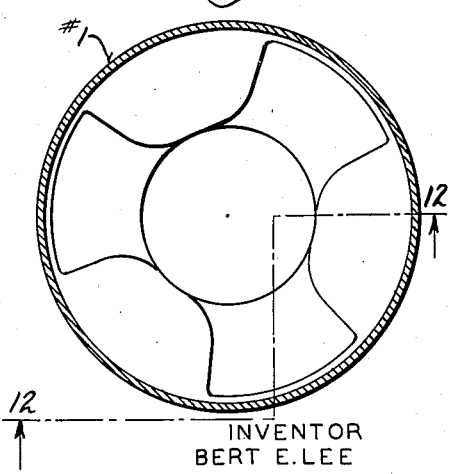
Fig. 13 is a transverse section of the same, seen as though cut along the line 13—13 of Fig. 12.
Figure 14:
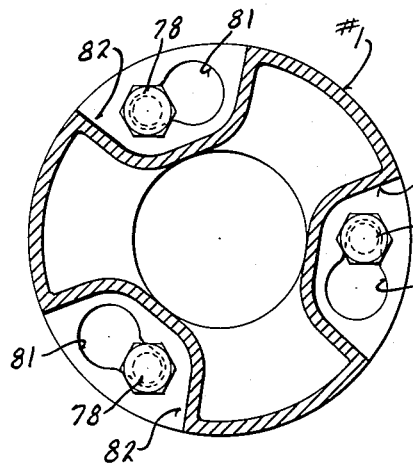
Fig. 14 is a transverse section of the same, seen as though cut along the line 14—14 of Fig. 12.
Figure 15:
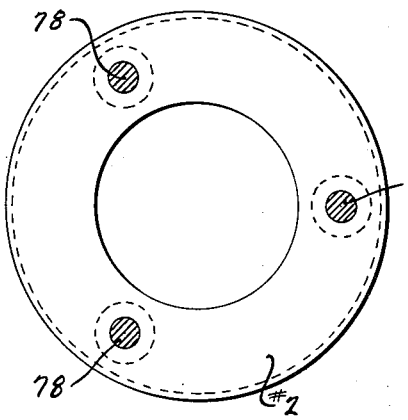
Fig. 15 is a transverse section of the same, seen as though cut along the line 15—15 of Fig. 12.

Section #2 is then placed on lifter 35, and is winched-up into coaxially aligned contact with and beneath section #1, as shown in Fig. 11. The two sections are then secured together in the following manner. See Figs. 12 and 14.

Before section #2 is raised, bolts 78 are unscrewed slightly from bosses 79. Cotter pins 80 limit this unscrewing movement, or the loss of these bolts at any time. As section #2 is being raised it is twisted or partially rotated manually so that each bolt-head will pass up through the large end of corresponding pear-shaped hole 81 into recess 82 in the lower end of section #1 (see Fig. 14). One of the two sections #1 or #2, but preferably #2 is then rotated with respect to the other, until the several bolts 78 of #2 are in the small ends of the pear-shaped holes 81 of #1 whereupon the bolts 78 are tightened by reaching into recesses 82 formed adjacent the lower end of section #1 and inwardly of the cylindrical exterior of such section.

Although the attaching means just described, or some means similar thereto, is to be preferred, other attaching means may be substituted, and this other means may even be external, provided such external means is such as can pass through the openings in the guide-rings, or the guide-rings be altered to adapt them to such passing.

Figure 16:
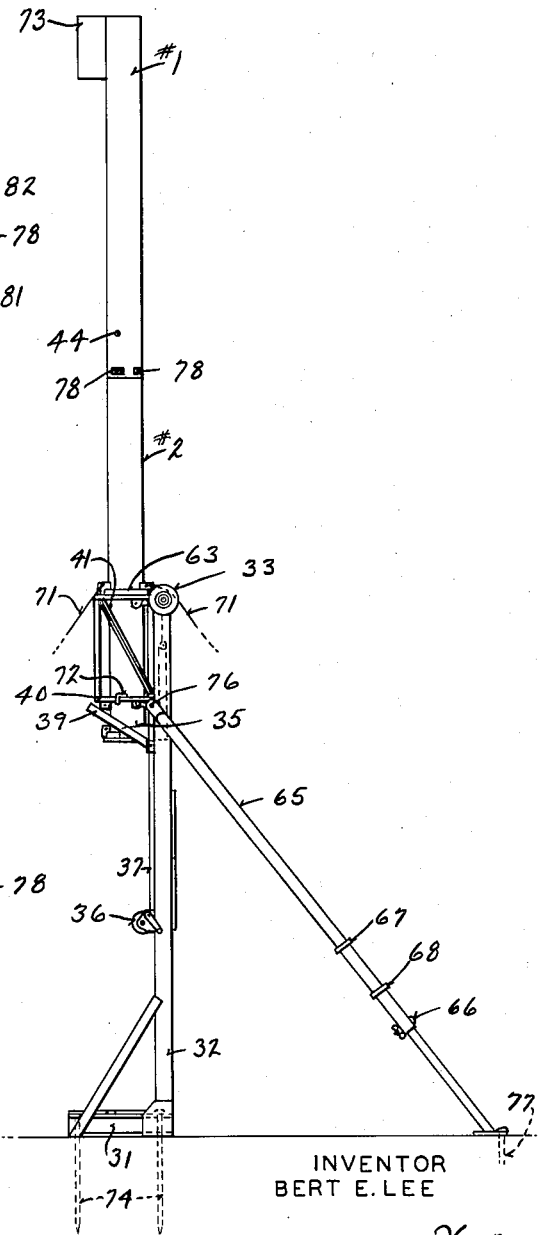
Fig. 16 is a side elevation similar to Figs. 10 and 11, but with the two joined sections raised.

Pin 72 is then removed from section #1 and the two sections raised together by moving lifter 35 to its position shown in Fig. 16. Pin 72 then is reinserted into pin-tube 44 of section #2.

The process is then repeated with sections #3, et seq.

When the first four sections are raised together, and after section #4 has been attached to section #3, radially outwardly projecting rollers 83 on #3 pick up guy-rope ring 63 with guy wires or ropes 71 attached thereto. See Figs. 18, 19, and 20.

When section #9 has finally been attached to section #8 and pin 72 withdrawn, the assembly, instead of being raised is lowered slightly by means of lifter 35, to the position shown in Fig. 17a. The lifter is then bolted to the bottom platform 31 by bolts 50, as shown in Fig. 8. Pin 72 is removed from pin-tube 44 of #8, and this pin or a longer lever is inserted in pin-tube 44 of #9, and the entire assemblage of tower-sections is thereby rotated until the apparatus at its top is oriented in the proper direction. The assembly is thereafter locked against further undesired rotation by clamp ring 52, actuated by manual cam 55 and operating to grip the lower and of section #9.

Guy-ropes 71 attached to ring 63 are then staked-out to the ground at 120° intervals, and the erection of the tower has been completed. An experienced team of two men can erect the tower in from 10 to 20 minutes.

If the orientation needs to be changed at any time after the completion of erection, the roller contact of the guy-rope ring will permit this after releasing manual cam 55 and locking ring 50.

Disassembling the nine tower-sections may be briefly described as follows. See Figs. 17, 17(a), (b), and (c). Unstake the guy-ropes 71. Unbolt the lifter 35 from the bottom platform 31. Lift the assemblage until pin-tube 44 of #8 comes above guide-ring 40, and pin #8 there.

Unbolt #9 from #8, and remove #9. Bring the lifter up to the bottom of #8. Unpin #8. Lower the assemblage, and pin #7 above guide-ring 40.

Repeat the process of the last prior paragraph, to remove successive sections, until only #1 remains. Tip the base over horizontally, and unpin and remove #1.

It will be readily evident from the foregoing description that this invention affords a novel and easily erected sectional portable tower, capable of being easily dismantled and stored compactly in its own base-section.

Although shown and described for mounting on the ground, the tower could be mounted on a truck, with its base hinged to the truck, for tilting from a horizontal to a vertical position.

Now that one embodiment of the invention has been shown and described, and several minor variations thereupon have been suggested, it is to be understood that the invention is not to be limited to the specific forms or arrangements of parts herein shown and described, or suggested.

What is claimed is:

1. In a sectional portable tower, the combination of: a plurality of tower sections of substantially uniform cross-section with respect to each other and throughout each; a base, for supporting the sections when assembled and erected; hoist-means, carried on and guided by the base, including means for engaging the bottom end of each section in succession to move the same relative to said base and extend and retract the tower, section by section; means for locking each section in turn to the base, after its extending movement therealong by said hoist means, whereby the latter may be disengaged from such locked section to engage and move the next succeeding section into a position of coaxially aligned adjacency therebeneath, means for locking successive sections coaxially together, end to end, prior to each successive extension of the tower; and means carried by the base, for guiding successive sections as they are being raised or lowered.

2. A sectional portable tower, according to claim 1, wherein the section-guiding means comprises two guide-means, one axially spaced from the other, each such guide-means comprising a plurality of rollers defining an orifice for engaging the exterior of successive sections of the tower, and means supporting said rollers, said orifices being coaxially aligned with the base and that means of the hoist-means which successively engages the sections and with said sections.

3. A sectional portable tower, according to claim 1, wherein there is at least one guy-rope ring of internal diameter slightly larger than the external diameter of the tower-sections, said ring having means for the attachment of guy-ropes; and wherein at least one of the tower-sections carries a plurality of rollers, on axes projecting radially from the section, for engagement with the ring as it passes through the latter, whereby the said one section may pick up and support the ring during erection, and may rotate within the ring when erected.

4. A sectional portable tower, according to claim 1; wherein the base includes a horizontal bottom platform; and there is means for anchoring the section engaging means of the hoist-means to the bottom platform of the base.

5. A sectional portable tower, according to claim 1, wherein the section engaging means of the hoist-means includes a clamp, for locking the assemblage of tower-sections against rotation.

6. Method of erecting a sectional tower, which method comprises the following steps: inserting the uppermost section of the tower into a vertical guide on a base; raising said section to a first elevated position on said base, securing this section to the base in its said first elevated position against downward motion and releasing said hoist means therefrom; firmly attaching the top end of the next section to the bottom end of the preceding section thereby to coaxially assemble the same while the latter is secured in its said first elevated position; releasing said uppermost section and raising the assembled sections through the guide by force applied to the bottommost of the assembled sections to bring said bottommost section to a first elevated position on said base; securing said bottommost section to the base against downward motion; repeating the last three steps until only one section remains unattached; attaching the top end of this last section to the bottom end of the last prior section; simultaneously orienting the assembled sections by rotating the same to a desired position; and finally securing the assembled sections to the base, against translation and rotation.

7. A sectional tower comprising: a plurality of successive abutting longitudinal tower sections; a tower base; hoist means guided by and carried on said base and adapted to engage the lower end of the upper one of each two succeeding tower sections for longitudinally moving it to a first elevated position on said base sufficient to receive the next succeeding lower one of said tower sections in upright position beneath its lower end; means on said base for temporarily holding said upper section in said first elevated position and locking the same against axial and rotational movement while said hoist is lowered to engage the lower end of the said next succeeding tower section therebeneath; complementary attaching connections at the adjacent ends of said two succeeding tower sections for releasably attaching the lower one of said two tower sections in upright end-to-end abutting relationship to the lower end of said upper one of said two succeeding tower sections while the latter is locked in said first elevated position; and means for securing the assembled abutting tower sections in upright position to said base.

8. In an extensible portable tower the combination of, a plurality of elongated tower sections of substantially uniform cross-section, a base for supporting the assembled tower and the said sections thereof during both extension and retraction of the tower, section by section; hoist means, guided by and movable along the base, including means for engaging and supporting each tower section and operable to move the same relative to said base when extending and retracting the tower; means selectively operable for locking said tower sections to said base for support by the latter during extension of the tower and for unlocking the same for retraction of the tower, whereby said hoist means may successively engage each tower section and raise it into coaxial alignment with a previously raised section for connection thereto when extending the tower and conversely may engage and lower each raised section in turn independently of remaining raised sections when retracting the tower, means for detachably interconnecting adjacent successive tower sections coaxially together, end-to-end; and means carried by the said base for guiding successive tower sections as they are being raised and lowered by said hoist means.

References Cited in the file of this patent

UNITED STATES PATENTS

| | | |
|---|---|---|
| 11,694 | Goolman et al. | Sept. 19, 1854 |
| 713,911 | McPartland | Nov. 18, 1902 |
| 1,138,826 | Younis | May 11, 1915 |
| 1,187,321 | Hubbard | June 13, 1916 |
| 1,257,699 | Gray | Feb. 26, 1918 |
| 1,506,277 | Strauss | Aug. 26, 1924 |
| 1,696,772 | Malone | Dec. 25, 1928 |
| 2,369,534 | Cohen | Feb. 13, 1945 |
| 2,483,396 | Benson | Oct. 4, 1949 |
| 2,645,315 | Frushour | July 14, 1953 |
| 2,693,255 | Dicke et al. | Nov. 2, 1954 |
| 2,739,850 | Hollingsworth | Mar. 27, 1956 |
| 2,857,994 | Sheard | Oct. 28, 1958 |

FOREIGN PATENTS

| | | |
|---|---|---|
| 22,335 | Great Britain | of 1911 |
| 1,112,760 | France | Nov. 23, 1955 |